(12) United States Patent
Sun et al.

(10) Patent No.: US 7,636,128 B2
(45) Date of Patent: Dec. 22, 2009

(54) POISSON MATTING FOR IMAGES

(75) Inventors: Jian Sun, Beijing (CN); Jiaya Jia, Hong Kong (HK); Heung-Yeung Shum, Beijing (CN)

(73) Assignee: Microsoft Corporation, Redmond, WA (US)

( * ) Notice: Subject to any disclaimer, the term of this patent is extended or adjusted under 35 U.S.C. 154(b) by 788 days.

(21) Appl. No.: 11/183,226

(22) Filed: Jul. 15, 2005

(65) Prior Publication Data

US 2007/0013813 A1   Jan. 18, 2007

(51) Int. Cl.
*H04N 9/74* (2006.01)
*H04N 9/76* (2006.01)

(52) U.S. Cl. ................ 348/586; 348/598; 348/597; 348/590; 348/578; 348/584; 382/284; 345/630; 345/640

(58) Field of Classification Search ........... 348/586, 348/598, 597, 584, 590, 578, 722; 382/284, 382/173; 345/630, 640, 592
See application file for complete search history.

(56) References Cited

U.S. PATENT DOCUMENTS 6,134,345 A    10/2000  Berman et al.
2006/0221248 A1* 10/2006 McGuire et al. ........... 348/587

OTHER PUBLICATIONS

Chuang, et al., "A Bayesian Approach to Digital Matting", retrieved on Mar. 20, 2009 at <<http://grail.cs.washington.edu/projects/digital-matting/image-matting/>>, In Proceedings of IEEE CVPR 2001, IEEE Computer Society, vol. 2, Dec. 2001, pp. 264-271, 4 pages.

Chuang, et al., "Video Matting of Complex Scenes", ACM, Proceedings of the 29th Annual Conference on Computer Graphics and Interactive Techniques, Session: Images and Video, 2002, pp. 243-248.

Elder, et al., "Image Editing in the Contour Domain", IEEE Transactions on Pattern Analysis and Machine Intelligence, vol. 23, Issue 3, Mar. 2001, pp. 291-296.

Fattal, et al., "Gradient Domain High Dynamic Range Compression", ACM, Proceedings of the 29th Annual Conference on Computer Graphics and Interactive Techniques Session: Images and Video, 2002, pp. 249-256.

Finlayson, et al., "Removing Shadows From Images", Computer Vision—ECCV 2002: 7th European Conference on Computer Vision, May 28-31, 2002, pp. 129-132.

(Continued)

*Primary Examiner*—M. Lee
*Assistant Examiner*—Jean W Désir
(74) *Attorney, Agent, or Firm*—Lee & Hayes, PLLC

(57) ABSTRACT

An exemplary method includes receiving a trimap for an image that specifies a background region, a foreground region and an unknown region for the image wherein a boundary exists between the foreground region and the unknown region and wherein another boundary exists between the unknown region and the background region, solving a set of Poisson equations having boundary conditions for the two boundaries to provide a matte that distinguishes a foreground region from a background region in the unknown region, and refining the matte by solving a set of Poisson equations for a local unknown region. Various other exemplary technologies are also presented.

20 Claims, 11 Drawing Sheets

IMAGE (I)
300

EXEMPLARY METHOD 310

RECEIVE IMAGE
312

SPECIFY REGIONS
316

SOLVE POISSON EQUATIONS
320

OTHER PUBLICATIONS

Hillman, et al., "Alpha Channel Estimation in High Resolution Images and Image Sequences" Proceedings of the 2001 IEEE Computer Society Conference on Computer Vision and Pattern Recognition, vol. 1, 2001, pp. I-1063-I-1068.

Mitsunaga, et al., "AutoKey: Human Assisted Key Extraction", ACM, Proceedings of the 22nd Annual Conference on Computer Graphics and Interactive Techniques, 1995, pp. 265-272.

Narasimhan, et al., "Interactive Deweathering of an Image Using Physical Models", IEEE Workshop on Color and Photometric Methods in Computer Vision, In Conjunction with ICCV, Oct. 2003, 8 pgs.

Perez, et al., "Poisson Image Editing", ACM, ACM Transactions on Graphics (TOG), vol. 22, Issue 3, Jul. 2003, pp. 313-318.

Perona, et al., "Scale-Space and Edge Detection Using Anisotropic Diffusion", UC Berkeley EECS Technical Reports, Dec. 20, 1988, Also, IEEE Transactions on Pattern Analysis and Machine Intelligence, vol. 12, Issue 7, Jul. 1990, pp. 629-639, 41 pgs.

Qian, et al., "Video Background Replacement Without a Blue Screen", Proceedings 1999 International Conference on Image Processing, vol. 4, Oct. 24-28, 1999, pp. 143-146.

Ruzon, et al., "Alpha Estimation in Natural Images", Proceedings IEEE Conference on Computer Vision and Pattern Recognition, vol. 1, Jun. 13-15, 2000, pp. 18-25.

Smith, et al., "Blue Screen Matting", ACM, Proceedings of the 23rd Annual Conference on Computer Graphics and Interactive Techniques, 1996, pp. 259-268.

Sun, et al., "Poisson Matting", ACM Transactions on Graphics (Tog), Special Issue: Proceedings of the 2004 Siggraph Conference Session: Interacting With Images, vol. 23, Issue 3, 2004, pp. 315-321.

* cited by examiner

I (Image) = αF + (1 − α)B

Pulling of Matte

101

α (Matte)

102

αF (Foreground Only)

EXEMPLARY PROCESSES 400

IMAGE 410

IMAGE 430

$A \sim A^*$
412

$A < A^*$
414

$A > A^*$
416

$|D| \sim |D^*|$
432

$|D| < |D^*|$
434

$|D| > |D^*|$
436

EXEMPLARY PROCESSES 500

Boosting Brush
610

Highpass Filter
620

Diffusion
730

Cloning
740

Exemplary Process
800

Exemplary Process
900

901

902

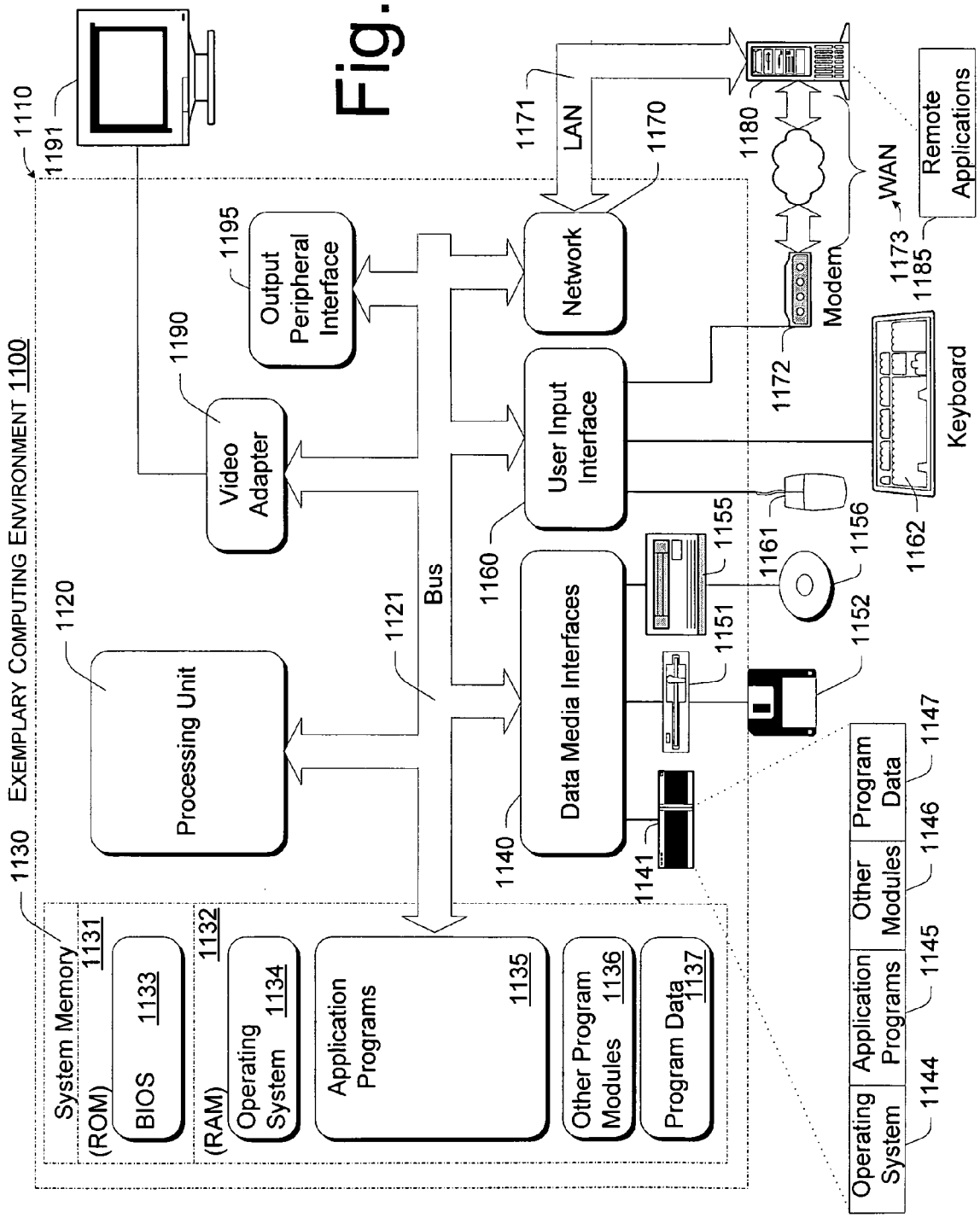

US 7,636,128 B2

POISSON MATTING FOR IMAGES

BACKGROUND

In image composition, a new image can be blended from a background image and a foreground image through use of an alpha matte of the image. On the other hand, separation of the alpha matte, the foreground and the background from a given image is a more difficult process, often referred to as the pulling of matte problem, or simply matting.

For example, in blue screen matting, the alpha matte and foreground can be readily reconstructed because the background is known (e.g., from a user-controlled environment). In contrast, for natural image matting, the alpha matte, the foreground and the background need to be estimated. Further, natural image matting is inherently under-constrained due to the number of unknowns of the matting equation. Thus, a need exists for improved natural image matting techniques. Various exemplary techniques described herein aim to address this and other issues associated with matting.

SUMMARY

Natural image matting is an important tool for digital image editing such as for cutting and pasting selected objects from one image to another image and replacing the background of the selected objects. Various exemplary techniques presented herein reconstruct a matte from a continuous matte gradient field by solving Poisson equations using boundary information, for example, from a given trimap. Refinement may occur by interactively manipulating the matte gradient field using a number of filtering tools. A local result can be seamlessly integrated into the global result.

BRIEF DESCRIPTION OF THE DRAWINGS

Non-limiting and non-exhaustive examples are described with reference to the following figures, wherein like reference numerals generally refer to like parts throughout the various views unless otherwise specified.

FIG. 11 is a diagram of an exemplary computing environment, which may be used to implement various exemplary technologies described herein.

DETAILED DESCRIPTION

Figure 1:
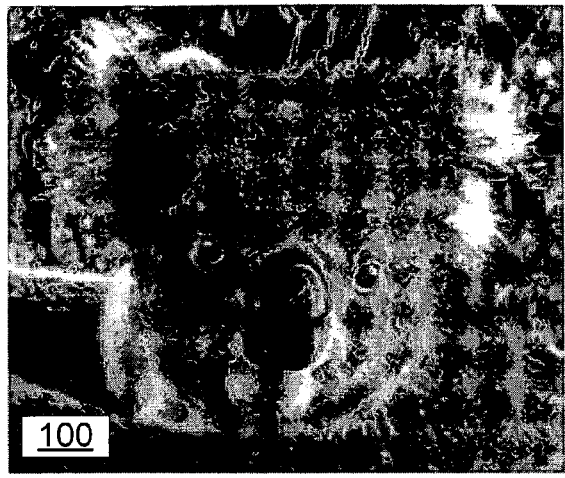
FIG. 1 is a natural image, a corresponding alpha matte and an extracted image, extracted from the natural image through use of the alpha matte.
Figure 1:
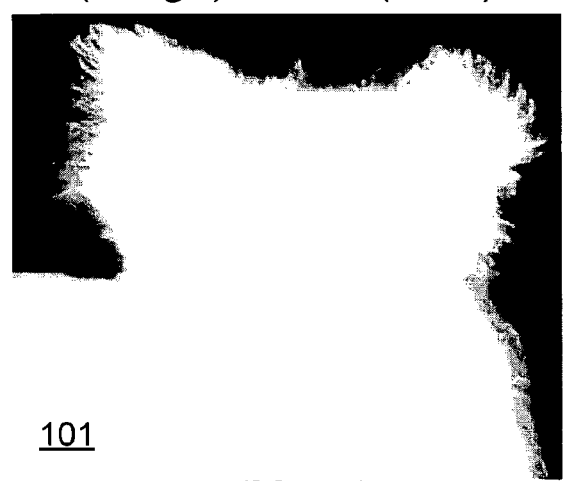
Figure 1:
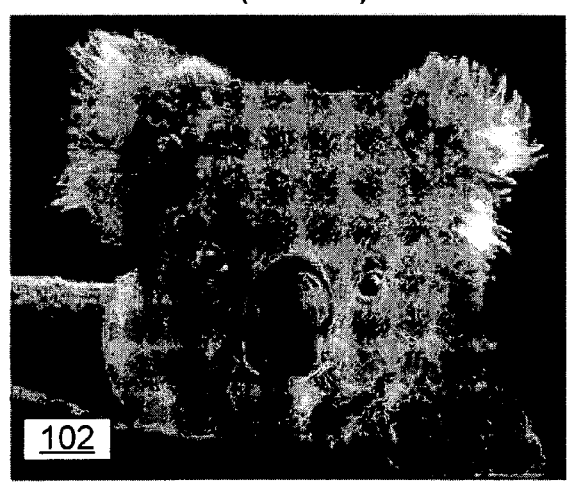

As described herein, Poisson matting is applied to natural images, including those with complex scenes. Traditional techniques typically optimize a pixel's alpha, background and foreground colors in a statistical manner, in contrast, Poisson matting can operate directly on the gradient of a matte, which can reduce error caused by mis-classification of color samples. An exemplary method uses Poisson matting to estimate a gradient matte from an image and then reconstruct the matte by solving a set of Poisson equations. Various other exemplary techniques are also discussed.

An exemplary method for natural image matting includes solving Poisson equations with a matte gradient field. Such a method is, at times, referred to herein as Poisson matting. Such a method can generate a matte from a continuous matte gradient field by solving Poisson equations using boundary information, for example, from a user-supplied trimap (i.e., a three region map for an image). An exemplary method may include refinement of a matte gradient field using a number of tools (e.g., filtering, cloning, etc.), whereby a user can further improve Poisson matting results. Further, a modified local result may be seamlessly integrated into a final global result. Various examples are presented using complex natural images to demonstrate the quality of matting results through use of Poisson matting. Poisson matting is optionally used with other matting techniques, for example, Bayesian matting.

The discussion that follows includes various equations for purposes of illustrating how the Poisson equation may be applied to a pulling of matte problem or to matte refinement. The Poisson equation is a second-order partial differential equation (e.g., including a term of the form $\Delta \Phi$, where $\Delta$ is the Laplacian operator or the vector Laplacian, $\nabla^2$, may be included). Various exemplary techniques may use variants of the Poisson equation or, for example, use equations that include a second-order partial differential term for an alpha matte.

For a color image, the foreground F and the background B can be specified as color components together with an alpha channel matte, for example, RGB:

$$\left\{ \begin{array}{ccc} & \alpha & \\ F_r & F_g & F_b \\ B_r & B_g & B_b \end{array} \right\}$$

An alpha channel has various uses, including, for example, masking objects, making them transparent, or adding specific color instructions. In the $\{\alpha, F, B\}$ matrix, the alpha channel is a matte that distinguishes the foreground and background in an RGB image. As described herein, a user may desire constructing such a matrix for an image through a process referred to as matting, which aims to find an appropriate α and F.

Matting is inherently under-constrained because the matting equation has too many unknowns. Therefore, user interaction is often required to obtain good mattes. For example, in natural image matting, a user may be required to supply a trimap that partitions the image into three regions: "definitely foreground", "definitely background" and "unknown region".

Given an alpha matte, in image composition, a new image I(x, y) can be blended from a background image B(x, y) and a foreground image F(x, y) using the alpha matte α(x, y). A matting equation ((x,y) arguments deleted for clarity) may be specified as follows:

$$I=\alpha F+(1-\alpha)B \qquad (1)$$

As already mentioned, separation of α, F and B from a given image I is called the pulling of matte problem, or simply matting. In blue screen matting, α and F are generally reconstructed where B is known from a user-controlled environment. In contrast, for natural image matting, all variables α, F and B need to be determined. Ease of such a determination depends on complexity of the image and the desired quality of the result. Where the highest quality result is desired, many have resorted to tedious pixel-by-pixel editing. Various exemplary techniques described herein aim to reduce or eliminate a need for such editing.

FIG. 1 shows an image 100, an alpha matte 101 and a foreground only image 102 with a blue background. As mentioned, the process of generating the alpha matte is referred to as "pulling of matte". Various exemplary techniques described herein are directed to this process. The image 100 is a natural image that includes a koala as a foreground object against a complex color background. To use this koala with a different background, a user needs to extract the koala from the image 100. The fur extending from the ears of the koala complicate the process. In particular, the foreground hairs and the background branches are easily confused, especially in regions of low contrast. Various exemplary Poisson matting techniques can be used to generate a high quality matte for use in extracting the koala from the image 100. The extracted image of the koala can then be used, for example, to form a composite image.

Various exemplary techniques described herein rely on one or more assumptions. For example, an initial assumption can be that intensity change in the foreground and background of an image gradient is smooth. Given this assumption and a trimap for the image, an exemplary method uses global Poisson matting to approximate a matte from an image gradient. Accordingly, foreground and background colors can be robustly estimated.

In instances where global Poisson matting fails to produce high quality mattes, for example, due to a complex background, an exemplary technique uses local Poisson matting, which can be used to manipulate a continuous gradient field in a local region.

Local Poisson matting optionally relies on user input or interaction into a "pulling the matte" loop. In most cases, image gradients caused by foreground and background colors are visually distinguishable locally. Knowledge from a user can be integrated into Poisson matting using, for example, a set of tools that can operate on the gradient field of the matte.

Local Poisson matting can maintain continuities of thin long threadlike shapes of foreground objects in a complex scene, such as that of the image 100 of FIG. 1. Moreover, after local operations, modifications in a gradient field can be seamlessly propagated into a global matte.

Figure 2:
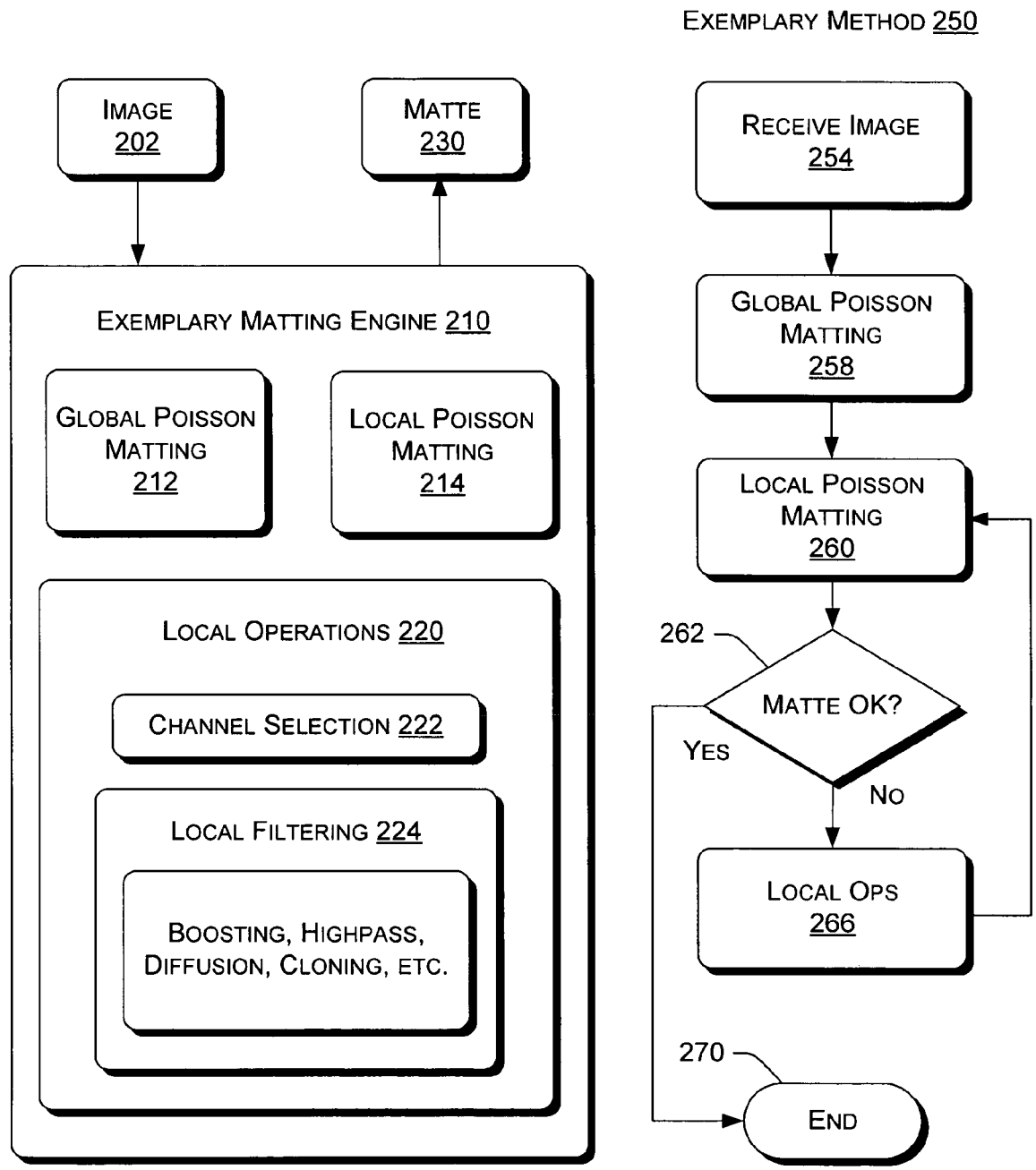
FIG. 2 is a diagram of an exemplary matting engine and an exemplary matting method that rely on solving Poisson equations.

FIG. 2 shows an exemplary matting engine and an associated method 200. The exemplary matting engine 210 includes a global matting component 212 and a local matting component 214 along with various other components. The other components include components for one or more local operations 220. In the example of FIG. 2, the local operations 220 include a channel selection component 222 and a local filtering component 224. The local filtering component 224 provides for one or more operations such as boosting, highpass filtering, diffusion filtering, cloning, etc., some of which are described in detail further below.

The exemplary matting engine 210 operates to receive an image 202 and to generate a matte 230. Again, the matte 230 may be an alpha matte that allows for extracting an object or foreground from the image 202. The exemplary matting engine 210 typically allows for iterative operation, for example, where a user may examine the matte 230 and, in turn, use one or more local operations to refine or otherwise increase the quality of the matte 230. Such operations may require recalculation of the matte 230 using the global or local matting components 212, 214.

An exemplary method for matting 250 also appears in FIG. 2. The exemplary method 250 may rely on the exemplary matting engine 210 or one or more components included therein. According to the exemplary method 250, a reception block 254 acts to receive an image or information about an image. A global matting block 258 uses the image or image information to formulate and solve a set of Poisson equations to thereby provide a global matte.

After the global Poisson matting operation 258, the method 250 enters a local matting block 260 that uses information from the global matting operation 258 together with information about a local region of the received image to generate a local matting solution by solving a set of Poisson equation with boundary conditions pertaining to the local region. This local operation may be repeated one or more times for the same, overlapping or different local regions of the received image.

A decision block 262 decides if the matte result produced using global Poisson matting and local Poisson matting is acceptable. If the matte is acceptable (i.e., OK), then the method 250 terminates in an end block 270. However, if the matte is unacceptable (i.e., not OK), then the method 250 continues in a local operations block 266 where one or more local operations are used to refine the matte. After applying the one or more local operations, in this example, the method 250 returns to the local Poisson matting block 260.

As already mentioned, a result from local Poisson matting can be incorporated into a global result. Further, a plurality of local results may be incorporated into a global result.

Details and examples follow whereby Poisson matting and related techniques are used for matting. For example, a technique is mentioned for use in solving a set of Poisson equations with associated boundary conditions. Further, various local operations are mentioned. Again, such examples are given to demonstrate the exemplary techniques as other solvers and other local operations may be used, as appropriate.

An exemplary technique uses Poisson matting where an approximate gradient field of matte is computed from an input image and then a resulting matte is obtained from its gradient field by solving Poisson equations.

A general relationship between a matte (α) and a matte gradient (g) may be specified depending on the whether one wishes to derive a matte (α) from a matte gradient (g) or vice versa. For example, $g=-\nabla\alpha$ or $\Delta\alpha=\text{div}(g)$ where $\nabla=(\partial/\partial x,$ ∂/∂y) is the gradient operator, $\Delta=(\partial^2/\partial x^2+\partial^2/\partial y^2)$ is the Laplacian operator and $\text{div}=(\partial g_x/\partial x+\partial g_y/\partial y)$ is the divergence operator. The equation for deriving a matte (α) from a matte gradient (g) is in the form of a Poisson equation.

Various boundary conditions may be specified for a Poisson equation, where the surface vector (ds) is directed outwardly from a region Ω. For example, a Dirichlet boundary condition may specify a value for α at the boundary ∂Ω; whereas a Neumann boundary condition may specify a value for the derivative of α with respect to the surface vector (ds). Other boundary conditions may be used as appropriate or a combination of boundary values (e.g., Dirichlet, Neumann, Cauchy, etc.).

Figure 3A:
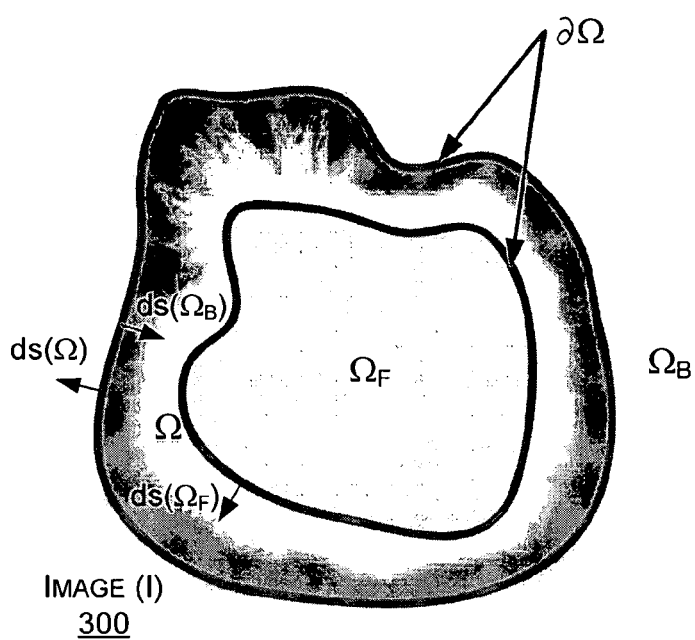
FIG. 3A is a diagram of a trimap for an image and an exemplary method that can specify the trimap and solve Poisson equations to provide a matte for the image.
Figure 3A:
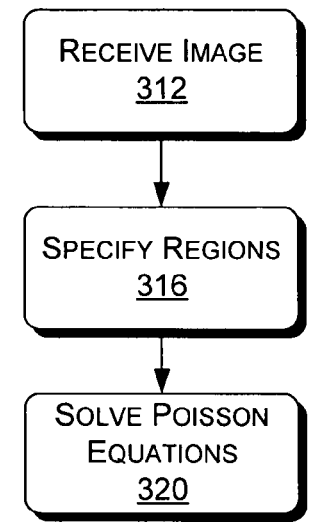

FIG. 3A shows an exemplary trimap image 300 that corresponds to the image 100 of FIG. 1 and an exemplary method 310 for global Poisson matting. The image 300 shows various regions and boundary conditions for use in Poisson matting (e.g., global or local). The image 300 of FIG. 3A shows the trimap $\{\Omega_F, \Omega_B, \Omega\}$ as, for example, specified by a user, where ∂Ω is the exterior boundary of unknown region Ω. Various outward normal vectors ds are shown for the various regions including $ds(\Omega_B)$, $ds(\Omega_F)$ and $ds(\Omega)$. Such an example may be used for global Poisson matting.

The exemplary method 310 includes a reception block 312 where a matting engine receives an image. An operation block 316 follows that divides the image into a three regions: a background region, a foreground region and an unknown region. Such an operation block may specifying a background region, a foreground region and an unknown region wherein a boundary exists between the foreground region and the unknown region and wherein another boundary exists between the unknown region and the background region. A solution block 320 solves a set of Poisson equations having boundary conditions for the two boundaries to provide a matte that distinguishes a foreground region from a background region in the unknown region.

Figure 3B:
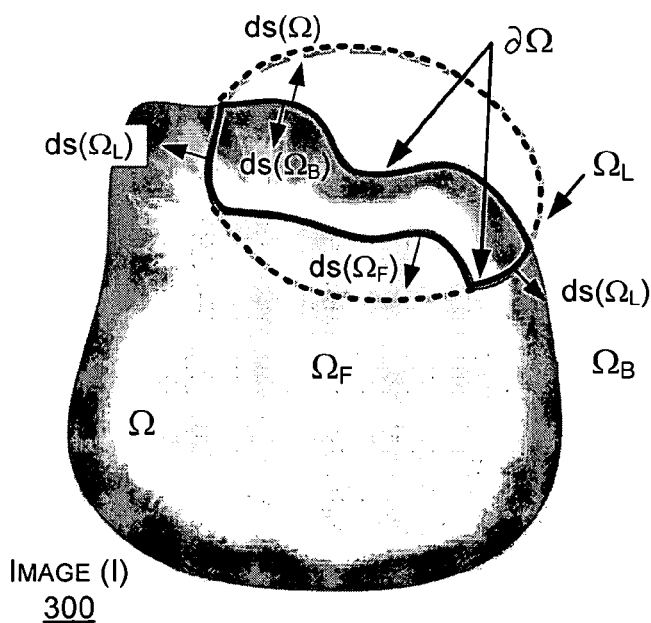
FIG. 3B is a diagram of a local trimap for a local region of an image and an exemplary method that can specify the local trimap and solve Poisson equations to provide a local matte for the local region.
Figure 3B:
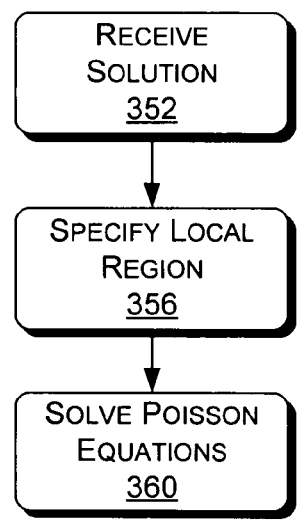

FIG. 3B shows the exemplary trimap image 300 with an additional region $\Omega_L$, which suitable for use in exemplary local Poisson matting, as described below, where selection of a local region $\Omega_L$ occurs (e.g., interactively by a user, automatically, etc.) and where ∂Ω is the exterior boundary of local unknown region $\Omega \cap \Omega_L$. FIG. 3B also shows outward normal vectors $ds(\Omega_L)$ for the local region where it boundaries extend between the foreground region $\Omega_F$ and the background region $\Omega_B$.

Yet further, FIG. 3B shows an exemplary method 350 for local Poisson matting. The exemplary method 350 includes a reception block 352 that receives a matte, for example, from the solution block 320 as provided by global Poisson matting. An operation block 356 follows that specifies a local unknown region wherein a boundary exists between a foreground region and the local unknown region and wherein another boundary exists between the local unknown region and a background region. A solution block 350 solves a set of Poisson equations having boundary conditions for the two boundaries to provide a matte that distinguishes a foreground region from a background region in the local unknown region.

As described herein, various exemplary techniques use gradient manipulation. Gradient manipulation may occur locally or globally. For Poisson matting, a differential matting equation can be used, depending on various conditions or assumptions. In order to get an approximate gradient field of matte and, hence, a differential matting equation, one takes the partial derivatives of both sides of the matting equation, which results in Equation 2:

$$\nabla I = (F-B)\nabla\alpha + \alpha\nabla F + (1-\alpha)\nabla B \qquad (2)$$

This is the differential form of the matting equation. For color images or other multi-component images, channels, etc., may be specified (e.g., $F_r$, $F_g$ and $F_B$, etc.).

Various assumptions may be made or conditions satisfied that allow for simplification of the differential matting equation. For example, in situations where foreground F and background B are smooth (i.e., $\alpha\nabla F+(1-\alpha)\nabla B$ is relatively small with respect to $(F-B)\nabla\alpha$), an approximate matte gradient field may be specified as follows:

$$\nabla\alpha \approx (F-B)^{-1}\nabla I \qquad (3)$$

Thus, according to Equation 3, the matte gradient is proportional to the image gradient. Others have used an approximate equation of such form for other purposes that included estimation of opacity around the boundaries of a solid object through integration of the gradient of matte along a 1D path perpendicular to the boundary of the object. Various exemplary techniques described herein use such an approximation to reconstruct a matte more efficiently through solving Poisson equations in a 2D image space directly.

Referring again to the image 300 of FIG. 3A, $\Omega_F$, $\Omega_B$ and $\Omega$ can be defined as "definitely foreground", "definitely background" and "unknown" regions of an image I, respectively. For each pixel p=(x, y) in the image (see, e.g., the image 100), $I_p$ is its intensity and $F_p$ and $B_p$ are the foreground and background intensity, respectively. According to an exemplary global matting approach, $N_p$ is defined as the set of its four neighbors. Other approaches may be used as well. According to the exemplary approach, the exterior boundary of the unknown region Ω is specified as $\partial\Omega=\{p\in\Omega_F\cup\Omega_B|N_p\cap\Omega\neq 0\}$.

To recover the matte in the unknown region Ω given an approximate (F−B) and image gradient ∇I involves minimization of the following variational problem:

$$\alpha^* = \arg\min_\alpha \int\int_{p\in\Omega}\left\|\nabla\alpha_p - \frac{1}{F_p-B_p}\nabla I_p\right\|^2 dp \qquad (4)$$

with Dirichlet boundary condition $\alpha|_{\partial\Omega}=\hat{\alpha}|_{\partial\Omega}$. These conditions are specified as follows:

$$\hat{\alpha}_p|_{\partial\Omega}=1\ p\in\Omega_F;\ 0\ p\in\Omega_B \qquad (5)$$

Such a definition is consistent with a user-supplied trimap. The associated set of Poisson equations with the same boundary condition is as follows:

$$\Delta\alpha = \text{div}(\nabla I(F-B)^{-1}) \qquad (6)$$

Obtaining the unique solution of Poisson equations is a well studied problem. For example, various examples presented herein included use of the Gauss-Seidel iteration with overrelaxation method to provide solutions. In such examples, for color images, both (F−B) and ∇I were measured in the grayscale channel.

An exemplary technique uses iterative optimization for global Poisson matting. A particular technique involves:

1. (F−B) initialization. Absolute values of F and B are not necessary, since (F−B) provides enough information to determine the matte. Initially, for each pixel p in Ω, $F_p$ and $B_p$ are approximated by corresponding the nearest foreground pixel in $\Omega_F$ and background pixel in $\Omega_B$. Then, the constructed (F−B) image is smoothed by a Gaussian filter to suppress significant changes due to noise and inaccurate estimation of F and B.

2. α reconstruction. α is reconstructed by solving Poisson equations (6) using the current (F−B) and ∇I.

3. F, B refinement occurs, for example, by letting $\Omega^+_F = \{p \in \Omega | \alpha_p > 0.95, I_p \approx F_p\}$. The condition $\alpha_p > 0.95$ and $I_p \approx F_p$ guarantees that the pixels in $\Omega^+_F$ are mostly foreground. Similarly, such refinement lets $\Omega^+_B = \{p \in \Omega | \alpha_p < 0.05, I_p \approx B_p\}$. Here, $F_p$, $B_p$ and $I_p$ represent the color vectors at pixel p. In this example, update of $F_p$ and $B_p$ occurs according to the color of the nearest pixels in $\Omega_F \cup \Omega^+_F$ and in $\Omega_B \cup \Omega^+_B$, respectively. Also, in this example, a Gaussian filter is applied to smooth (F−B).

According to this exemplary technique, iteration occurs for the above steps 2 and 3 until change in the matting results is sufficiently small or, for example, both $\Omega^+_F$ and $\Omega^+_B$ are empty in step 3. For many images, only a few iterations are typically needed. For each iteration, the selection of $\Omega^+_F$ and $\Omega^+_B$ has little associated error, which acts to guarantee that more accurate colors in these two regions are further propagated into less accurate neighboring pixels.

Global Poisson matting works well in scenes with a smooth foreground and background. However, for a complex image, Equation 3 may not be a good approximation of the matte gradient globally, where the background and foreground gradients cannot be ignored. Thus, as described herein, an exemplary technique can use local Poisson matting, for example, to locally refine the global Poisson matting result.

Equation (2) can be rewritten as:

$$\nabla\alpha = A(\nabla I - D) \qquad (7)$$

where $A = (F-B)^{-1}$ and $D = [\alpha \nabla F + (1-\alpha)\nabla B]$. A affects the matte gradient scale in that increasing A would sharpen boundaries (i.e., decreasing F−B). D is a gradient field caused by the background and foreground. Hence, estimation of A and D allows one to approach the ground truth, A* and D*.

In an exemplary global Poisson matting process, A is automatically estimated from the image and D is assumed to be zero. When the background or foreground has strong gradients, global Poisson matting may require attention to produce a desired result.

Figure 4:
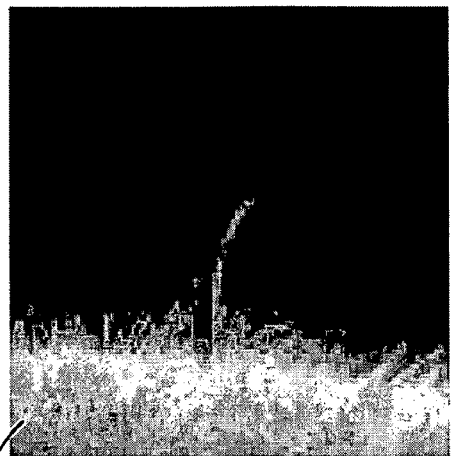
FIG. 4 is a series of images and mattes for various conditions where such conditions may be used to refine a matte or a matting process.
Figure 4:
Figure 4:
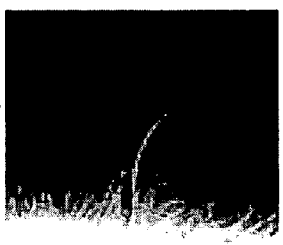
Figure 4:
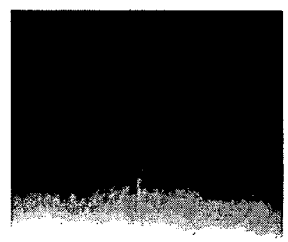
Figure 4:
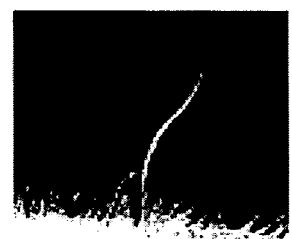
Figure 4:
Figure 4:
Figure 4:

FIG. 4 shows various exemplary processes 400 as applied to an image 410 and an image 430. The series of results 412, 414, 416 for image 410 pertains to A while the series of results 432, 434, 436 for image 430 pertains to D. These series demonstrate that resulting mattes solved by Poisson matting when A and D approximate A* and D* differently. The result 412 is for $A \approx A^*$, which is a result that quite accurately represents the image 410. The result 414 is for A<A*, which is a result that exhibits smoothing (i.e., a smooth matte) of the image 410. The result 416 is for A>A*, which is a result that exhibits sharpening (i.e., a sharp matte) of the image. Similarly, the most accurate matte for the image 430 occurs when |D|~|D*|, the result 432. Of course, where certain effects are desirable, |D|<|D*| or |D|>|D*| may be used (see corresponding results 434, 436).

An exemplary process for refining a result of global Poisson matting includes local Possion matting. For example, a user can specify a region $\Omega_L$ for refinement or enhancement and then apply local Poisson matting. Referring to the image I 300 of FIG. 3B, for a local integral region $\Omega_L$ a corresponding boundary exists: $\partial\Omega = \{p \in (\overline{\Omega_L \cap \Omega}) | N_p \cap (\Omega_L \cap \Omega) \neq 0\}$. Thus, the image I 300 of FIG. 3B illustrates a manner by which a selection of $\Omega_L$ can occur along with a corresponding boundary $\partial\Omega$ that, in this example, includes portions of the aforementioned global boundary (see, e.g., image 300 of FIG. 3A). The variational problem to be minimized in local Poisson matting is given by:

$$\alpha^* = \arg\min_\alpha \int\int_{p \in \Omega_L \cap \Omega} \|\nabla \alpha_p - A_p(\nabla I_p - D_p)\|^2 \, dp. \qquad (8)$$

with Dirichlet boundary condition $\alpha|_{\partial\Omega} = \hat{\alpha}|_{\partial\Omega}$. The local Dirichlet boundary condition $\hat{\alpha}|_{\partial\Omega}$ is defined as:

$$\hat{\alpha}_p|_{\partial\Omega} = 1 \; p \in \Omega_F; \; 0 \; p \in \Omega_B; \; \alpha_g \; p \in \Omega \qquad (9)$$

where $\alpha_g$ is the current matte value in an unknown region on the local boundary.

In the example image 300, which corresponds to the image 100 of FIG. 1, the local region size is fewer than 200×200 pixels. Time to solve the local problem normally depends on the size of the local region. In instances where a local Possion matting operation follows a global Poisson matting operation, because of existing boundary conditions, the local operation can be seamlessly propagated into the matte in a manner where boundary discontinuity is minimal.

An exemplary method allows for modification of A or D in a local region. For example, a user can modify A or D in a selected local region in an effort to produce a better approximation of $\nabla\alpha$. Further, two exemplary operations are optionally provided for such modification: channel selection and local filtering. Channel selection aims to reduce error associated with D whereas local filtering involves manipulation of A and D directly. Use of such operations can avoid a need to optimize a matte in a pixel-wise manner, and thereby allow for increased efficiency. Further, such operations may speed calculation of results.

Figure 5:
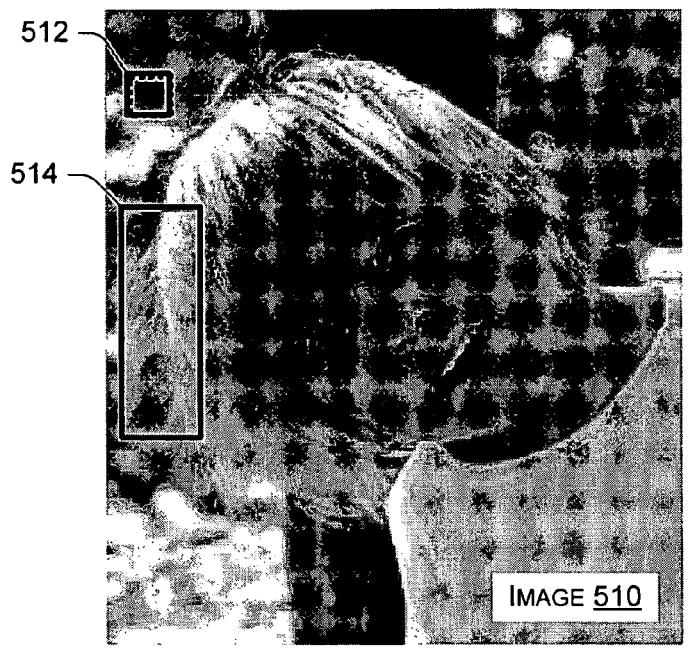
FIG. 5 is an image with corresponding channels and corresponding mattes that demonstrate refinement or optimization via channel selection techniques.
Figure 5:
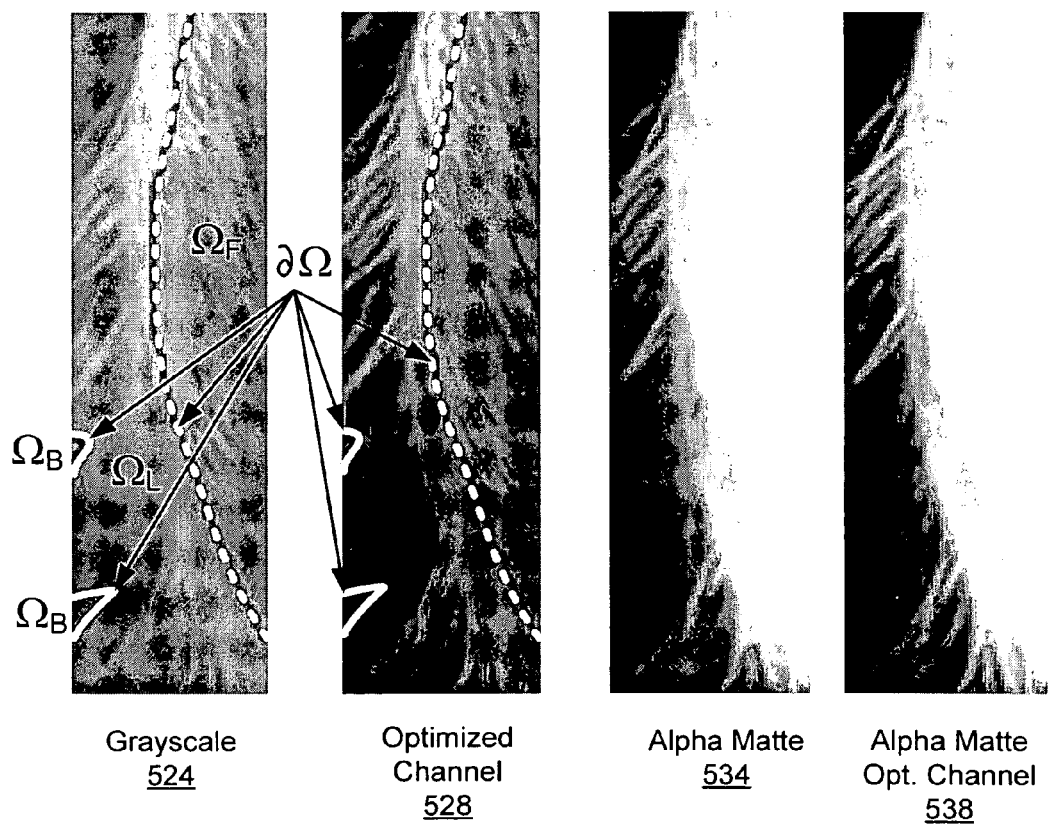

FIG. 5 shows various exemplary processes related to channel selection. An image 510 includes local regions 512 and 514. In an exemplary channel selection process, a user may select a local region for refinement, for example, consider the local region 514. The local region 514 includes various background colors that may appear elsewhere in the image 510. As such, a user may select samples from a closely matching "blue" region of the image 510 (see the local region 512, which is green in color, yet may be considered "blue" as it is a background region). An enlarged grayscale image 524 and a corresponding optimized channel image 528 of the local region 514 indicate portions of the boundary $\partial\Omega$, which is shown in solid line on the left side of the image along the boundary of the unknown local region $\Omega_L$ and the known, "definitely background" region $\Omega_B$ while a dashed line along the boundary of the known, "definitely foreground" region $\Omega_F$ and the unknown local region $\Omega_L$. Alpha mattes 534, 538 are computed from grayscale 524 and the optimized channel 528, respectively. The matte 538 generated from the optimized channel 528 is clearer when compared to the matte generated from the grayscale 524.

For color images, Equation (3) can be measured in different channels (e.g., any single R/G/B or grayscale channel). In various examples described herein, for global Poisson matting, the grayscale channel was used, $\nabla\alpha = A_g(\nabla I_g - D_g)$.

In general, the smooth background or foreground assumption makes $|D_g|$ small such that $A_g \nabla I_g$ is a typically good approximation of $\nabla\alpha$. Similarly, in a local region, an exemplary process constructs a new channel $\gamma = aR + bG + cB$ with a smooth background or foreground in which $|D_\gamma|$ is smaller than $|D_g|$. Thus, such an exemplary process may minimize the variance of the foreground or background colors, and the new channel $\gamma$ as follows:

1. A user selects either background or foreground color samples $\{(R_i \; G_i \; B_i)\}_{i=1}^N$ in an image using, for example, a simple brush. Such a process is optionally automated in a manner that reduces user input.

2. Computation of weights (a b c) occurs to minimize sample variances $\Sigma_i^N(\gamma_i-\gamma)^2$ in the new channel, which poses a linearly constrained quadratic optimization problem:

$$\min_{a,b,c} \sum_i \left[ (a\,b\,c) \cdot (R_i\ G_i\ B_i)^T - (a\,b\,c) \cdot (\overline{R}\ \overline{G}\ \overline{B})^T \right]^2 \text{s.t. } a+b+c=1 \qquad (10)$$

where (R G B) is the mean color value of the samples. The weights (a b c) are obtained by solving an augmented linear system. Such an exemplary process was used to produce the improved optimized channel matte 538 of FIG. 5. In this example, error associated with D is reduced and the hair shape of the local region 514 is better recovered. Consequently, information from such a process may be applied to other regions.

As already mentioned, filtering may be used to refine or otherwise improve results. Filtering can operate directly on A and D. Local filters can be used to manipulate a matte gradient field. Described herein are various exemplary filter operations, referred to as a boosting brush, a highpass filter, a diffusion filter and a clone brush.

An exemplary boosting brush filter operation can be used, for example, when a matting result is smoother or sharper than what user may expect. In particular, such a boosting brush can be used to increase or decrease A directly (e.g., $A=(F-B)^{-1}$). Image series 610 of FIG. 6 includes use of a boosting brush that has a local Gaussian shape for each pixel p in a given brush area where $A_p$ is modified to $A'_p$ using the boosting brush operation:

$$A'_p = \left[1 + \lambda \exp\left(-\frac{\|p-p_0\|^2}{2\sigma^2}\right)\right] \cdot A_p \qquad (11)$$

where $p_0$ is the coordinate of the brush center, $\sigma$ and $\lambda$ are user defined parameters to control the size and strength of the boosting effect. Hence, the user can boost the whole or partial region by using brushes of various sizes. If $\lambda>0$, this filter will increase A.

Figure 6:
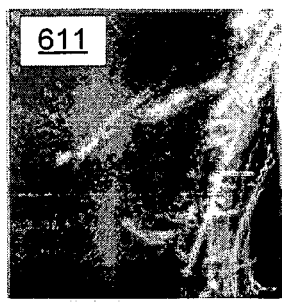
FIG. 6 is a series of images with corresponding gradient mattes and alpha mattes that demonstrate refinement or optimization via boosting and highpass filtering.
Figure 6:
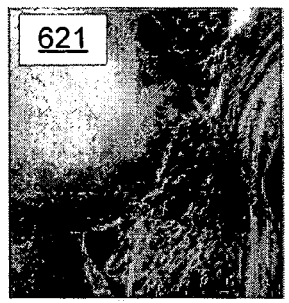
Figure 6:
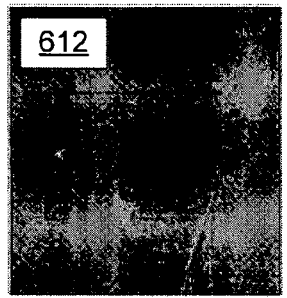
Figure 6:
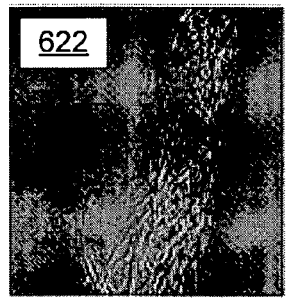
Figure 6:
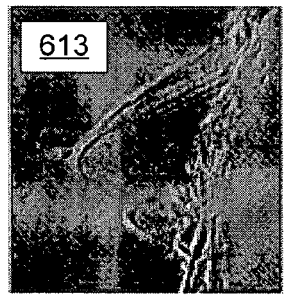
Figure 6:
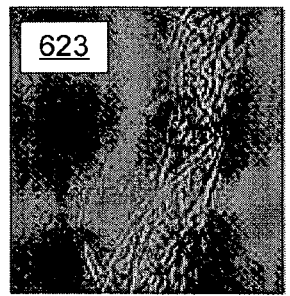
Figure 6:
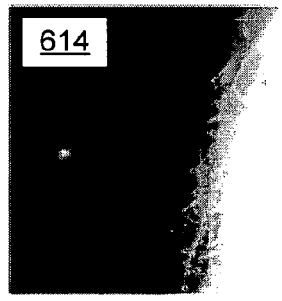
Figure 6:
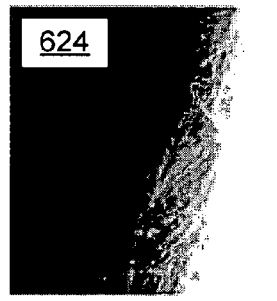
Figure 6:
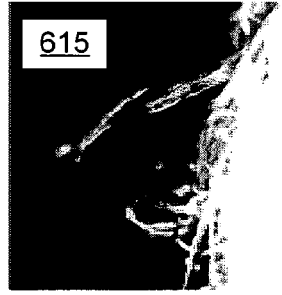
Figure 6:
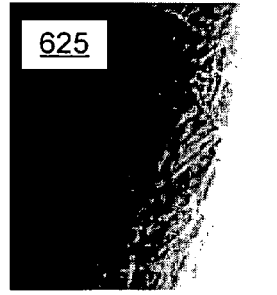

With respect to the series 610 of FIG. 6, the top image is an input image 611, the next is a matte gradient 612 prior to application of the brush operation, and the next is a matte gradient 613 after application of the brush operation. The lower two images are of alpha mattes 614, 615 that correspond to the matte gradients 612, 613, respectively. The result generated through use of the exemplary brush operation is of higher quality. In particular, more contiguous hair strands can be distinguished as a smooth alpha matte is sharpened after applying the boosting brush.

An exemplary process optionally includes highpass filtering. For example, a channel selection operation can generate a smooth background or foreground, leading to low frequency background or foreground gradients. In such an example, D can be estimated using the low-frequency part of the image gradient:

$$D = K * \nabla I$$

where $K=N(p;p_0,\sigma^2)$ is a Gaussian filter centered at pixel $p_0$ and * is the convolution operator. From Equation (7), $\nabla\alpha=A(\nabla I-K*\nabla I)$, where $(\nabla I-K*\nabla I)$ corresponds to a highpass filter. The series 620 of FIG. 6 demonstrates that a clear alpha matte structure is recovered after applying highpass filtering.

With respect to the series 620 of FIG. 6, the top image is an input image 621, the next is a matte gradient 622 prior to application of the highpass operation, and the next is a matte gradient 623 after application of the highpass operation. The lower two images are of alpha mattes 624, 625 that correspond to the matte gradients 622, 623, respectively. The result generated through use of the exemplary highpass operation is of higher quality.

Figure 7:
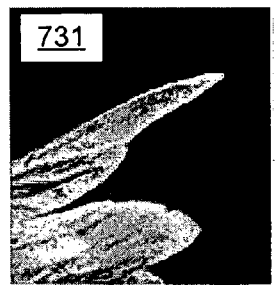
FIG. 7 is a series of images with corresponding gradient mattes and alpha mattes that demonstrate refinement or optimization via diffusion filtering and cloning.
Figure 7:
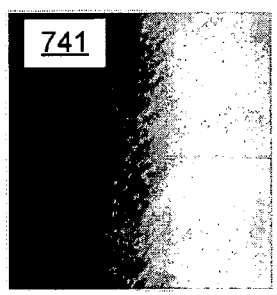
Figure 7:
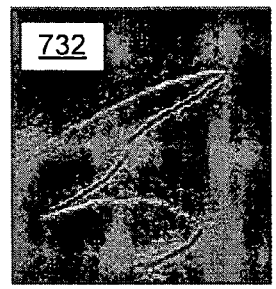
Figure 7:
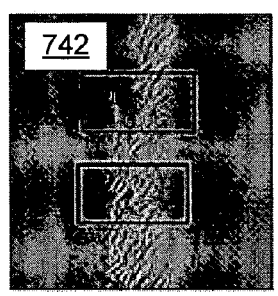
Figure 7:
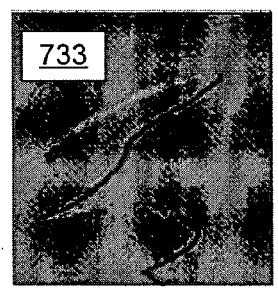
Figure 7:
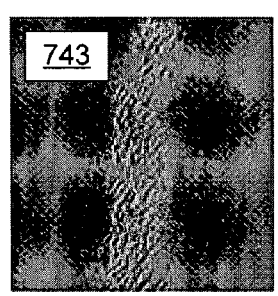
Figure 7:
Figure 7:
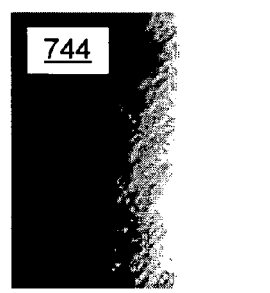
Figure 7:
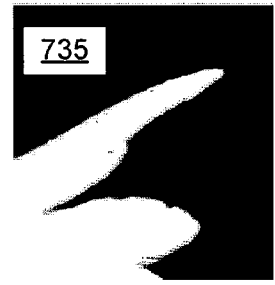
Figure 7:
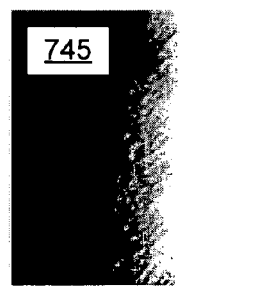

An exemplary process optionally includes diffusion filtering. On the boundary of a solid object where alpha matte changes quickly, A$\nabla$I generally provides a good approximation; however, the image gradient $\nabla$I is sensitive to noise and blocking effects that may be present in, for example, JPEG images. In the example series 730 of FIG. 7, anisotropic diffusion was used to diffuse an image 731 that included background noise. The background noise in the image 731 exists in the matte 732 and carries over to the alpha matte 734. In this example, the applied diffusion operation was an edge-preserving blurring process that aimed to remove such small scale noise. Accordingly, an image gradient $\nabla$I was re-computed from a diffused image (not shown). The gradient matte 733 exhibits less small scale noise than the gradient matte 732. In addition, the alpha matte 735 has less small scale noise when compared to the alpha matte 734. Thus, the exemplary diffusion process acts to suppress noise, which, in turn, can produce a better matte result.

An exemplary process optionally includes cloning, for example, using a clone brush. Such a clone brush can copy a matte gradient from a local region to another region. In the series 740 of FIG. 7, a lower box represents a selected local region while an upper box represents a region to which clone information is applied, i.e., information from the lower box is applied (e.g., cloned or pasted) to the region of the upper box.

According to an exemplary clone technique, in some situations, cloning can be used to directly copy a matte gradient $A(\nabla I-D)$ from a source region to a target region. In the series 740 of FIG. 7, cloning is applied to a region (upper box of gradient matte 742) where foreground and background are, to the eye, fairly indistinguishable. The resulting gradient matte 743 and alpha matte 745 exhibit more detail and less blur.

Other exemplary processes for enhancing images or mattes include an erase brush for erasing that can, for example, remove unwanted alpha matte regions directly; and an inverse brush that can inverse an incorrect sign of a matte gradient.

As described above, various enhancement or refinement processes may be used to arrive at a suitable result. For example, with various aforementioned local operations, a user can refine a matte in a selected region. An exemplary process is based on a global Poisson matting result and uses local Poisson matting as follows:

1. Apply channel selection to reduce the errors in D. For solid object boundaries, apply the diffusion filter to remove possible noise;
2. Apply the highpass filtering to obtain an approximation of D;
3. Apply the boosting brush to manipulate A; and
4. Optionally apply the clone brush if gradients are indistinguishable.

The aforementioned, erase brush and inverse brush can be optionally applied in any step. At each step, local Poisson matting can typically generate results very quickly (e.g., depending on resources and local region size).

An exemplary GUI utility provides a user with an option to observe the matting result and select any remaining unsatisfactory regions for further refinement.

Figure 8:
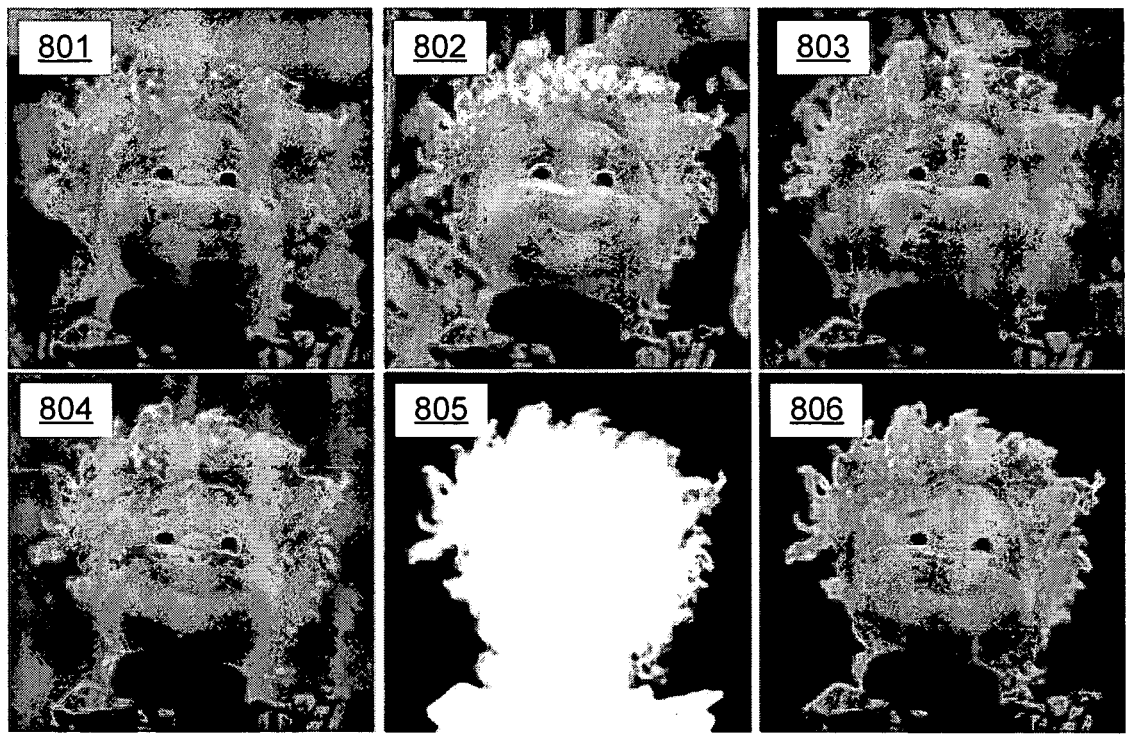
FIG. 8 is a series of images that help to demonstrate an exemplary process to handle multiple backgrounds in an image.

An exemplary process can be applied to matting with multiple backgrounds. FIG. 8 shows various images 801-806 as pertaining to an exemplary process 800. An exemplary process lets $\{I_t\}_{t=1}^T$ be images of the same foreground F with multiple different backgrounds $\{B_t\}_{t=1}^T$. The exemplary process 800 may calculate the mean image without any information about backgrounds, as follows:

$$\bar{I} = \frac{1}{T}\sum_t^T (\alpha F + (1-\alpha)B_t) = \alpha F + (1-\alpha)\bar{B} \quad (12)$$

where $$\bar{B} = \frac{1}{T}\sum_t^T B_t$$

is the mean background. In general, $\bar{B}$ is a smoothed image for all backgrounds in $\{B_t\}_{t=1}^T$. The exemplary process 800 applies Poisson matting to the mean image as it may perform better than in any individual image in $\{I_t\}_{t=1}^T$. In the series of images 801-806, global Poisson matting is used, followed by local Poisson matting for a region at the lower right part of the image. The top row of this series shows three input images 801, 802, 803 with different complex backgrounds; whereas, the bottom row shows the mean of all eight input images 804, the computed alpha matte 805 and a composite image using Poisson matting 806.

Figure 9:
FIG. 9 is a foggy image and a de-fogged image that help to demonstrate an exemplary process to de-fog an image.
Figure 9:

An exemplary process can be applied to de-fog an image. FIG. 9 shows an image 901 and a de-fogged image 902 according to an exemplary process 900. In this example, the de-fogged image 902 is produced using the aforementioned boosting brush with several local operations.

A fog model can be represented as a matting equation:

$$I = I_c \cdot e^{-\beta d} + \text{Fog} \cdot (1 - e^{-\beta d}) \quad (13)$$

where Fog is the color of fog, $I_c$ is the clear image without fog, $\beta$ is the scattering coefficient of the atmosphere and d is the depth value. According to the exemplary process 900, local assignment of information produces acceptable results. Consider taking the partial derivatives of (13) to obtain $\nabla I_c = \nabla I \cdot e^{\beta d}$ with respect to assigned depth d. The aforementioned boosting brush is applied to locally modify $e^{\beta d}$ in the selected region to fine tune the defogged image gradient. By solving Poisson equations, any modification to the image can be automatically and seamlessly propagated to generate the de-fogged image without any visible boundaries.

Figure 10:
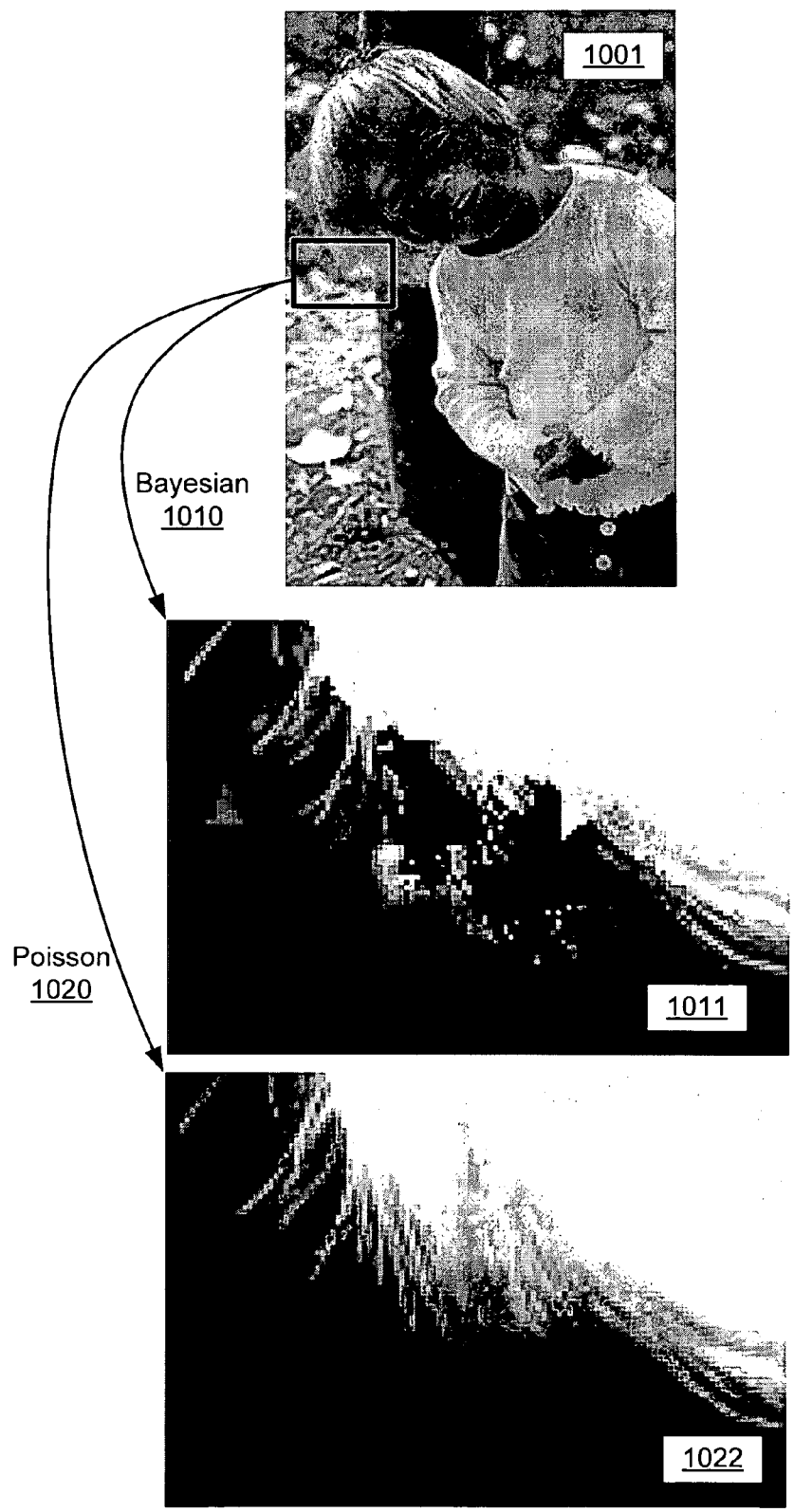
FIG. 10 is an image, a matte derived from exemplary Poisson matting and a matte derived from conventional matting for purposes of comparison.

FIG. 10 shows a comparison 1000 of an exemplary Poisson technique 1020 to a traditional Bayesian technique 1010. An image 1001 is selected and the two techniques applied. The result 1011 of the Bayesian technique 1010 includes discrete regions that do not accurately represent the fine hair of the girl in the image 1001. In contrast, the result 1022 of the Poisson technique 1020 provides a more suitable representation of her hair.

The result 1022 relies on an exemplary local Poisson matting process. Most images are very complex not only in foreground and background colors, but also in their gradient fields. Therefore, in this example, Bayesian matting, which relies on sampling color pixels, does not perform as well.

A close inspection of input images and matting results, indicates that Bayesian matting fails in places where foreground and background colors are similar, or their colors have large change so that correct samples are buried in the local region. However, Bayesian matting can have some advantages for certain natural images. An exemplary method optionally includes use of Poisson matting and Bayesian matting.

As discussed herein, various exemplary digital matting methods include use of Poisson equations or what is referred to as Poisson matting. By solving Poisson equations, Poisson matting can reconstruct a faithful matte from its approximated gradient field estimated from an input image.

Exemplary Computing Environment

The various exemplary technologies may be implemented in different computer environments. For example, various exemplary methods are typically computer-implementable. The computer environment shown in FIG. 11 is only one example of a computer environment and is not intended to suggest any limitation as to the scope of use or functionality of the computer and network architectures suitable for use. Neither should the computer environment be interpreted as having any dependency or requirement relating to any one or combination of components illustrated in the example computer environment.

FIG. 11 illustrates an example of a suitable computing system environment 1100 on which various exemplary methods may be implemented. Various exemplary devices or systems may include any of the features of the exemplary environment 1100. The computing system environment 1100 is only one example of a suitable computing environment and is not intended to suggest any limitation as to the scope of use or functionality of the invention. Neither should the computing environment 1100 be interpreted as having any dependency or requirement relating to any one or combination of components illustrated in the exemplary operating environment 1100.

Various exemplary methods are operational with numerous other general purpose or special purpose computing system environments or configurations. Examples of well known computing systems, environments, and/or configurations that may be suitable for implementation or use include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Various exemplary methods, applications, etc., may be described in the general context of computer-executable instructions, such as program modules, being executed by a computer. Such instructions may be stored on one or more computer-readable media. Generally, program modules include routines, programs, objects, components, data structures, etc., that perform particular tasks or implement particular abstract data types. Various exemplary methods may also be practiced in distributed computing environments where tasks are performed by remote processing devices that are linked through a communications network or other communication (e.g., infrared, etc.). In a distributed computing environment, program modules may be located in both local and remote computer storage media including memory storage devices.

With reference to FIG. 11, an exemplary system for implementing the various exemplary methods includes a general purpose computing device in the form of a computer 1110. Components of computer 1110 may include, but are not limited to, a processing unit 1120, a system memory 1130, and a system bus 1121 that couples various system components including the system memory 1130 to the processing unit 1120. The system bus 1121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1110 typically includes a variety of computer readable media. Computer readable media can be any available media that can be accessed by computer 1110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 1110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 1130 includes computer storage media in the form of volatile and/or nonvolatile memory such as read only memory (ROM) 1131 and random access memory (RAM) 1132. A basic input/output system 1133 (BIOS), containing the basic routines that help to transfer information between elements within computer 1110, such as during start-up, is typically stored in ROM 1131. RAM 1132 typically contains data and/or program modules that are immediately accessible to and/or presently being operated on by processing unit 1120. By way of example, and not limitation, FIG. 11 illustrates operating system 1134, application programs 1135, other program modules 1136, and program data 1137.

The computer 1110 may also include other removable/non-removable, volatile/nonvolatile computer storage media. By way of example only, FIG. 11 illustrates a hard disk drive 1141 that reads from or writes to non-removable, nonvolatile magnetic media, a magnetic disk drive 1151 that reads from or writes to a removable, nonvolatile magnetic disk 1152, and an optical disk drive 1155 that reads from or writes to a removable, nonvolatile optical disk 1156 such as a CD ROM or other optical media (e.g., DVD, etc.). Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1141 is typically connected to the system bus 1121 through a data media interface such as interface 1140, and magnetic disk drive 1151 and optical disk drive 1155 are typically connected to the system bus 1121 a data media interface that is optionally a removable memory interface. For purposes of explanation of the particular example, the magnetic disk drive 1151 and the optical disk drive use the data media interface 1140.

The drives and their associated computer storage media discussed above and illustrated in FIG. 11, provide storage of computer readable instructions, data structures, program modules and other data for the computer 1110. In FIG. 11, for example, hard disk drive 1141 is illustrated as storing operating system 1144, application programs 1145, other program modules 1146, and program data 1147. Note that these components can either be the same as or different from operating system 1134, application programs 1135, other program modules 1136, and program data 1137. Operating system 1144, application programs 1145, other program modules 1146, and program data 1147 are given different numbers here to illustrate that, at a minimum, they are different copies. A user may enter commands and information into the computer 1110 through input devices such as a keyboard 1162 and pointing device 1161, commonly referred to as a mouse, trackball or touch pad. Other input devices (not shown) may include a microphone, joystick, game pad, satellite dish, scanner, or the like. These and other input devices are often connected to the processing unit 1120 through a user input interface 1160 that is coupled to the system bus 1121, but may be connected by other interface and bus structures, such as a parallel port, game port or a universal serial bus (USB). A monitor 1191 or other type of display device is also connected to the system bus 621 via an interface, such as a video interface 1190. In addition to the monitor 1191, computers may also include other peripheral output devices such as speakers and printer, which may be connected through a output peripheral interface 1195.

The computer 1110 may operate in a networked environment using logical connections to one or more remote computers, such as a remote computer 1180. The remote computer 1180 may be a personal computer, a server, a router, a network PC, a peer device or other common network node, and typically includes many or all of the features described above relative to the computer 1110. The logical connections depicted in FIG. 11 include a local area network (LAN) 1171 and a wide area network (WAN) 1173, but may also include other networks. Such networking environments are commonplace in offices, enterprise-wide computer networks, intranets and the Internet.

When used in a LAN networking environment, the computer 1110 is connected to the LAN 1171 through a network interface or adapter 1170. When used in a WAN networking environment, the computer 1110 typically includes a modem 1172 or other means for establishing communications over the WAN 1173, such as the Internet. The modem 1172, which may be internal or external, may be connected to the system bus 1121 via the user input interface 1160, or other appropriate mechanism. In a networked environment, program modules depicted relative to the computer 1110, or portions thereof, may be stored in a remote memory storage device. By way of example, and not limitation, FIG. 11 illustrates remote application programs 1185 as residing on the remote computer 1180 (e.g., in memory of the remote computer 1180). It will be appreciated that the network connections shown are exemplary and other means of establishing a communications link between the computers may be used.

Although various exemplary methods, devices, systems, etc., have been described in language specific to structural features and/or methodological acts, it is to be understood that the subject matter defined in the appended claims is not necessarily limited to the specific features or acts described. Rather, the specific features and acts are disclosed as exemplary forms of implementing the claimed subject matter.

The invention claimed is:

1. A computer-implementable method comprising:
specifying, by a computing device, a background region, a foreground region and an unknown region for an image wherein a boundary exists between the foreground region and the unknown region and wherein another boundary exists between the unknown region and the background region; and
solving, by the computing device, a set of Poisson equations having boundary conditions for the two boundaries to provide a matte that distinguishes a foreground region from a background region in the unknown region.

2. The computer-implementable method of claim 1 further comprising:
specifying a local unknown region wherein a boundary exists between a foreground region and the local unknown region and wherein another boundary exists between the local unknown region and a background region; and
solving a set of Poisson equations having boundary conditions for the two local unknown region boundaries to provide a local matte that distinguishes a foreground region from a background region in the local unknown region.

3. The computer-implementable method of claim 2 further comprising incorporating the local matte into a global matte for the entire image.

4. The computer-implementable method of claim 2 further comprising repeating the specifying to specify different local region and solving a set of Poisson equations for the different local region.

5. The computer-implementable method of claim 2 further comprising filtering prior to the solving.

6. The computer-implementable method of claim 2 wherein the solving relies at least in part on a prior solution.

7. The computer-implementable method of claim 6 wherein the prior solution corresponds to a solution for the entire image.

8. The computer-implementable method of claim 6 wherein the prior solution corresponds to a solution for the local unknown region.

9. The computer-implementable method of claim 1 wherein the specifying includes receiving a trimap.

10. The computer-implementable method of claim 1 wherein the boundary conditions include a Dirichlet boundary condition.

11. The computer-implementable method of claim 1 wherein the boundary conditions include a Neumann boundary condition.

12. One or more computer storage media comprising processor executable instructions to perform the solving of claim 1.

13. A computer-implementable method comprising:
receiving, by a computing device, a trimap for an image that specifies a background region, a foreground region and an unknown region for the image wherein a boundary exists between the foreground region and the unknown region and wherein another boundary exists between the unknown region and the background region;
solving, by the computing device, a set of Poisson equations having boundary conditions for the two boundaries to provide a matte that distinguishes a foreground region from a background region in the unknown region; and
refining, by the computing device, the matte by solving a set of Poisson equations for a local unknown region.

14. The computer-implementable method of claim 13 wherein the refining comprises:
specifying a local unknown region wherein a boundary exists between a foreground region and the local unknown region and wherein another boundary exists between the local unknown region and a background region; and
solving a set of Poisson equations having boundary conditions for the two local unknown region boundaries to provide a local matte that distinguishes a foreground region from a background region in the local unknown region.

15. The computer-implementable method of claim 13 wherein the refining comprises at least one operation selected from a group consisting of filtering and channel selection.

16. The computer-implementable method of claim 13 wherein the refining comprises at least one operation selected from a group consisting of boosting, highpass filtering, diffusion filtering and cloning.

17. One or more computer storage media comprising processor executable instructions to perform the solving and refining of claim 13.

18. A computer-implementable method comprising:
specifying, by a computing device, a local unknown region for an alpha matte wherein a boundary exists between a foreground region and the local unknown region and wherein another boundary exists between the local unknown region and a background region; and
solving, by the computing device, a set of Poisson equations having boundary conditions for the two boundaries of the local unknown region to provide a refined alpha matte that distinguishes a foreground region from a background region in the local unknown region.

19. The computer-implementable method of claim 18 further comprising filtering the alpha matte prior to the solving.

20. One or more computer storage media comprising processor executable instructions to perform the specifying and solving of claim 18.

* * * * *